Patented Oct. 29, 1946

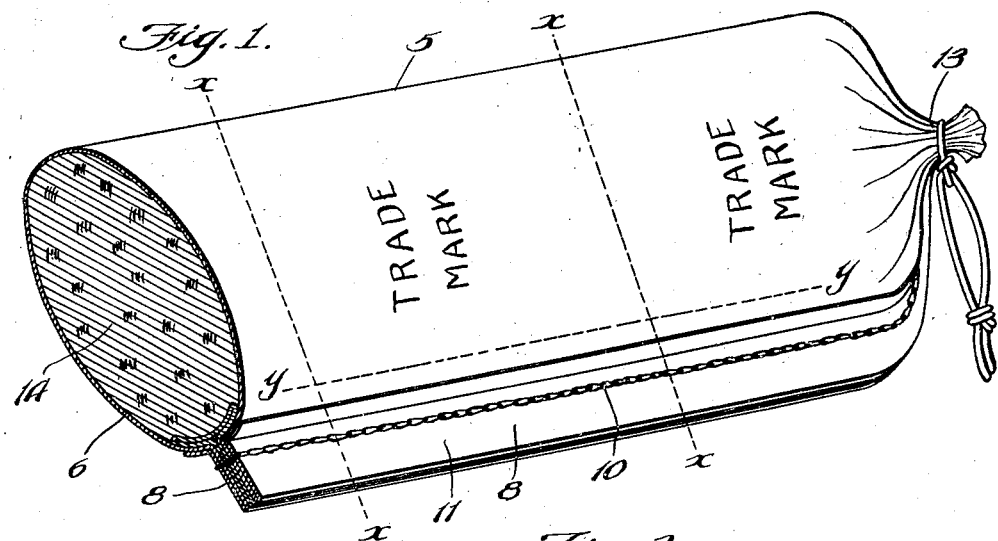
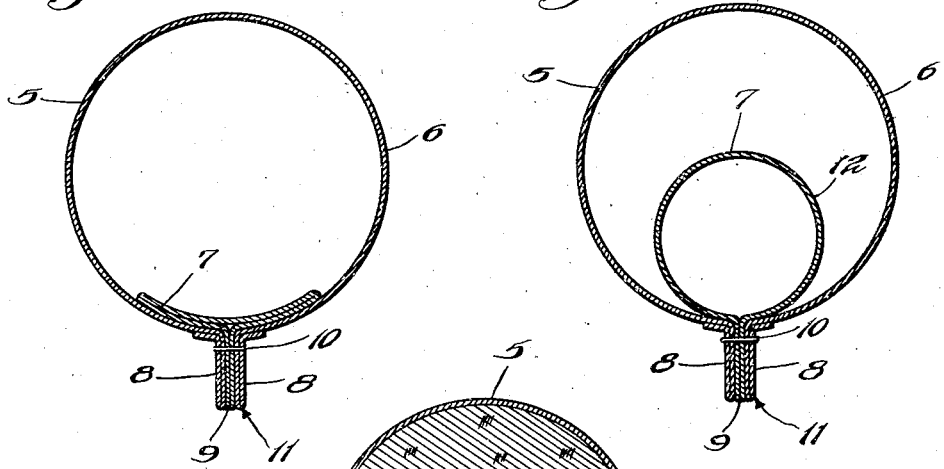
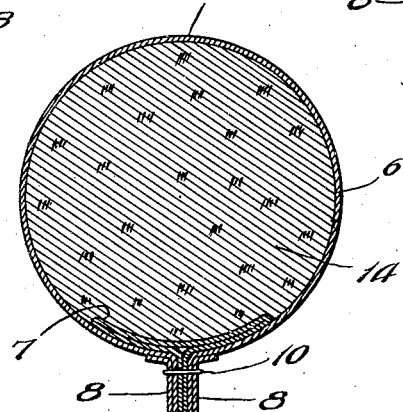

2,410,206

UNITED STATES PATENT OFFICE 2,410,206

CASING

Alpheus J. Freeman, Chicago, Ill., assignor, by mesne assignments, to Glenn S. Noble, Chicago, Ill.

Application August 1, 1938, Serial No. 222,428

13 Claims. (Cl. 99—176)

This invention relates to casings which are adapted to be used for all purposes for which they may be available but which are particularly intended for food products, including various types of sausages, and for convenience will be described in connection with the manufacture of sausage.

Sausage casings have heretofore comprised mainly the "natural casings" and artificial casings made of extruded cellulosic material and it has been proposed to make such casings of paper or fibrous material. However, casings made of paper or the like have not proven satisfactory or adapted for general use. Usually the edges of the strip which are overlapped to form the tubing have been glued or cemented together but on account of the necessary soaking and processing operations, such cementing has not proven practicable.

It has also been proposed to sew the edges together but as far as I am aware no successful method has been developed for this purpose prior to my invention. However, in my co-pending application for Manufacture of casings, Serial No. 226,113, filed August 22, 1938, I have shown, described, and claimed apparatus and method of making the casings forming the subject matter of the present application, and any method or apparatus referred to herein but not claimed is not intended to be dedicated to the public, but is to be included in said co-pending application.

The present invention includes a tubular casing formed of paper or other similar material, preferably of a fibrous character, with the longitudinal edges sewn together and means provided for closing the seam and also to assist in applying the casings to stuffer horns and permitting the ready slipping of the same off from the horns while being stuffed.

The objects of the invention are to provide an improved casing of the character set forth; to provide a casing formed of paper or the like, having a longitudinal seam and having an internal continuous welt, closure or gasket for closing the seam joint; to provide an artificial casing having a longitudinal seam with a tubular internal welt; to provide an improved method of making casings and cased products; to provide a tubular casing for food products having a longitudinal rib for opening the same; and to provide such other novel features and advantages as will be described hereinafter.

In the accompanying drawing illustrating this invention:

Figure 1 is a perspective view showing a filled casing;

Figure 2 is a cross sectional view illustrating the position of the flap or gasket after the casing has been finished but before being soaked;

Figure 3 is a diagrammatic sectional view illustrating the position of the parts in extended positions, for convenience in illustration; and Figure 4 is a cross sectional view of a filled casing such as shown in Figure 1.

These figures are more or less diagrammatic or exaggerated in parts, as the material from which the casing is formed is usually very thin. The casing 5 is formed of an outer strip 6, and an inner strip 7, preferably of parchment paper which may be impregnated with a softener such as glycerine, which also serves to keep the material pliable and in suitable condition for manufacturing and stuffing operation. The longitudinal edges of the strip 6 are folded back upon themselves as shown at 8 to reinforce the same and thus provide four thicknesses of material as shown in Figure 2. The edges 9 of the inner strip 7 are positioned between the folded edges 8, and these parts are secured together by stitching 10 which is preferably of the double locked stitch type which serves to hold all of these plies or edges securely together. The folded and projecting edges 8 and 9 preferably extend for a substantial distance beyond the stitching to provide a longitudinal rib 11 for convenience in tearing the casing open.

The strip 7 is relatively narrow so that the portion within the casing 5 forms a longitudinal tube 12 of smaller diameter than the casing as shown in Figure 3.

These casings may be made of any desired size and length and when they are used for sausages or wieners are preferably cut in sections of uniform length and one end of each section tied or fastened together as shown at 13. As commonly made in the regular manufacture of such casings they are made from strips of cellulosic material or parchment paper furnished in rolls from one thousand to twenty-five hundred feet in length. When the casings are to be stuffed, they are soaked in the usual manner, which softens the casing and also the inner strip 7. I have found that when plain tubular casings are formed of parchment paper without this inner welt, it is very difficult and impractical to apply the same when soaked, onto the stuffing horns and they do not pass freely off from the horn during the stuffing operation. However the tubular member 12 overcomes this difficulty and permits the ready application of the casing to the horn and facilitates the moving of the casing off from the horn while being stuffed. This is probably due to the fact that the inner tubular member provides an interrupted surface when the casing is drawn over the horn and also permits air to escape from the same and also along the sides thereof. Of course when the casing is slipped over the horn the tubular member 12 remains substantially flattened and conforms to the surface of the horn so that it assumes substantially the position shown in Figure 4.

After the casing is drawn over the horn the filling 14, which may comprise any food product, such as meats, sausage, cheese, or other material, is injected therein and the casing filled as shown in Figures 1 and 4. During the filling operation the tubular member 12 is pressed against the inner wall of the casing so that it makes a continuous longitudinal closure or welt which covers the joint formed by the seam between the edges of the strip 6, thus preventing any material from entering the seam or being discharged therethrough. When the casings are used for wieners, long sections are preferably stuffed without being linked and are smoked or otherwise processed in the usual manner, thus saving the cost of linking. After the sausage has been smoked the long straight sections may then be cut off to make short pieces of uniform size and length, thus further saving loss incident to the twisting or linking as heretofore performed. By leaving the ends open, as they are after the sections have been cut, the material is permitted to breathe and tends to prevent sliming or molding as with the usual linked product.

These sections as indicated by the lines X—X, Fig. 1, are more pleasing in appearance than the usual linked wienerwursts and are more conveniently packed in boxes or cans for sale. In some instances the casings may be removed before the contents is cut in sections, which provides a convenient method of manufacturing so-called "skinless" wieners. When the wieners are made with the casing left on they may be boiled and the casing then removed, for eating, or the casing may be first removed and the contents fried or otherwise cooked. In any event the longitudinal rib or projection 11 with the sewing therethrough provides a convenient means for ripping or tearing off the casing, and the interior flap or welt 7 also assists in making a uniform opening. When the rib is pulled to open the casing, both sides will usually be torn off along the lines at the edges of the inner flap as indicated at Y—Y. This makes a clean separation of the casing at both sides of the welt and the remaining portion of the casing may be readily removed from the contents.

From this description it will be readily apparent that any desired product may be enclosed in or covered with my improved casing with less liability of bacterial action than with natural casings inasmuch as the parchment paper may be thoroughly sterilized before being used. Furthermore the casing is more readily applied and is more easily removed than other so-called "artificial" casings and will not in any way affect the taste or flavor of the contents as is apt to occur with such casings as commonly used. My improved casing also has the qualities of stretching and shrinking which is desirable for sausages and furthermore provides a fibrous integument which will permit "breathing" which is also desirable or necessary for such products.

My improved casings are readily adapted for printing to indicate the nature of the goods, to show the manufacturer's name, trademark, or any other desired indicia. Such printing is shown on Fig. 1 and may be readily applied to the strips before they are formed into the casings.

While I have shown and described a commercial and practical embodiment of my invention I do not wish to be limited to the exact form or construction shown and described except as specified in the following claims, in which I claim:

1. A casing for food products, formed of a strip of parchmentized paper having its edges sewn together and having a longitudinal internal tubular welt which is flattened close to the inner wall of the casing for closing the joint formed by the seam the seam and stitching projecting longitudinally on the outside of the casing to form a rib which is useful in the ripping of the casing.

2. A tubular casing for food products, formed of a strip of parchment paper with its edges brought together and having a closure member also formed of a strip of parchment paper with its edges brought together between the edges of the first-named strip, and stitching through said edges to form the casing and also to form an inner tubular flap overlying the seam formed by the stitching the folds of the paper projecting outwardly from the stitching, forming a rib which is useful in removing the casing from the contents after the casing has been filled.

3. A casing formed of a single strip of paper having its edges stitched together to form a seam, and an inner longitudinal closure covering the seam said closure being formed of a single strip of paper folded longitudinally with its edges embraced between the edges of the casing strip and held in position by the stitching the folds of the strips projecting outwardly beyond the stitching forming a rib which is useful in the ripping of the casing.

4. A food product enclosed in a tubing formed of paper, having a longitudinal sewed seam with an inner tubular flap covering the same said flap being formed of paper with portions interfolded in said seam and stitched therewith, said seam and stitching projecting outwardly from the tubing and providing a tearing strip for removing the tubing from the food product.

5. An article of manufacture comprising a casing formed of a strip of fibrous material treated with a softening element, and formed into a tube by sewing the edges together and having an inner longitudinal tubular seal covering the seam between the edges said seal formed of a strip of paper with its edges interposed between the edges of the first-named strip the portions of the strips projecting outwardly forming a rib which is useful in the ripping of the casing.

6. A new article of manufacture comprising a casing formed of a strip of material having the longitudinal edges thereof extending outwardly, an inner seal also formed of a strip of material with its edges extending outwardly, and sewing through the outwardly projecting edges which forms a longitudinal rib which may be readily grasped at any point along the casing for tearing the casing open.

7. A casing of the character set forth, comprising a strip of paper, having its edges secured together by sewing to form a seam with a longitudinal rib projecting beyond the sewing, and having a tubular longitudinal internal welt which is formed of a single strip of paper, the edges of which project outwardly and are embraced by the edges of the first named strip and secured in position by said stitching, said welt being flattened and lying against the inner wall of the casing and covering the seam.

8. A new article of manufacture comprising a sausage product enclosed in a casing formed of a strip of parchmentized paper having its edges sewn together, and having a longitudinal internal tubular welt which is flattened between the sausage filler and the inner wall of the casing for closing the joint formed by the seam, the seam and stitching projecting longitudinally on the outside of the casing to form a rib which is useful in stripping the casing from the sausage product.

9. A food product enclosed in a casing formed of a strip of paper with its edges brought together, and having a closing member also formed of a strip of paper with its edges brought together between the edges of the first named strip, and stitching through the edges of both strips to complete the casing, and also to form an inner tubular flap which is positioned between the food product and the inner wall of the casing and overlying the seam formed by the stitching, the folds of the paper projecting outwardly from the stitching and forming a rib which may be grasped to remove the casing from the food product.

10. A tubular casing formed of a long strip of paper each edge of the strip being folded back upon itself with the outermost portion lying against the adjacent wall of the casing, the four thicknesses thus formed being fastened together by stitching close to the outer periphery of the casing and substantially tangential thereto when the casing is expanded, the edges extending beyond the stitching and forming a rib which is useful for removing the casing from any contents enclosed therein.

11. A new article of manufacture comprising a casing formed of a strip of parchment paper of indeterminate length, the edges of the strip being folded automatically back upon themselves and the folded portions extending a sufficient distance from the side of the casing to provide a longitudinal rib which may be readily grasped by the fingers to rip the casing open and stitching through the four thicknesses formed by the folded back edges, adjacent to the wall of the casing, whereby when the casing is extended or filled, the rib will project substantially radially with respect to the casing.

12. A tubular casing of the character set forth, formed of a long strip of fibrous material with longitudinal margins of substantially equal width folded back against the adjacent outer surfaces, said marginal portions being superposed to form four thicknesses, stitching through said marginal portions at a sufficient distance from the outer folded edges to provide a substantial outwardly projecting longitudinal rib which is useful to rip the casing for removing it from any contents enclosed therein, the oppositely folded edges of the margins projecting a substantial distance from the stitching at right angles to the rib, and providing reinforcement for the body of the casing along the line of stitching, and tending to make a tight seam due to the stitching lying in the reentrant angles in the margins.

13. A new article of manufacture, comprising a casing formed of a strip of parchment paper, the longitudinal margins being folded back against the outer adjacent surfaces of the casing, said folded portions lying together with their folded edges in alignment, stitching through the folded marginal portions at a sufficient distance from the folded edges to leave a longitudinal rib which projects substantially radially to the casing when filled, and providing means for ripping the casing, the outwardly extending edges of the margins lying against the outer surface of the casing and reinforcing the same along the seam.

ALPHEUS J. FREEMAN.